US006182274B1

United States Patent
Lau (12) United States Patent
(10) Patent No.: US 6,182,274 B1
(45) Date of Patent: Jan. 30, 2001

(54) REUSING CODE IN OBJECT-ORIENTED PROGRAM DEVELOPMENT

(75) Inventor: Christina Lau, Scarborough (CA)

(73) Assignee: International Business Machines Corporation, Armonk, NY (US)

( * ) Notice: Under 35 U.S.C. 154(b), the term of this patent shall be extended for 0 days.

(21) Appl. No.: 08/846,869

(22) Filed: May 1, 1997

(51) Int. Cl.[7] .................................................. G06F 9/44
(52) U.S. Cl. .......................... 717/1; 717/2; 717/3; 717/5
(58) Field of Search ................... 395/701, 702, 395/703, 705; 717/1, 2, 3, 5

(56) References Cited

U.S. PATENT DOCUMENTS

| | | | | |
|---|---|---|---|---|
| 5,191,646 | * | 3/1993 | Naito et al. | 345/349 |
| 5,313,387 | * | 5/1994 | McKeeman et al. | 364/400 |
| 5,522,078 | * | 5/1996 | Matsuzuki | 395/702 |
| 5,557,730 | * | 9/1996 | Frid-Nielsen | 345/349 |
| 5,625,844 | * | 4/1997 | Takaya | 710/33 |
| 5,754,858 | * | 5/1998 | Broman et al. | 395/701 |
| 5,778,378 | * | 7/1998 | Rubin | 707/103 |
| 5,790,861 | * | 8/1998 | Rose et al. | 395/705 |
| 5,809,507 | * | 9/1998 | Cavanaugh, III | 707/103 |
| 5,867,709 | * | 2/1999 | Klencke | 395/702 |
| 5,911,070 | * | 6/1999 | Solton et al. | 395/701 |
| 5,911,071 | * | 6/1999 | Jordan | 395/701 |
| 5,926,637 | * | 7/1999 | Cline et al. | 395/701 |
| 5,930,505 | * | 7/1999 | Miura | 395/701 |

FOREIGN PATENT DOCUMENTS 0406028   1/1991   (EP) ................................ G06F/9/46

OTHER PUBLICATIONS

"Rational Rose—Using Rational Rose 4.0"; Rational Software Corporation; Revision 4.0; pp. xi–xvi, 1–85, 185–197, Nov. 1996.*

Rational Rose/C++ –Round Trip Engineering with Rational Rose/C++; Rational Software Corporation; Revision 4.0; pp. 5–51 and 217–227, Nov. 1996.*

Channon, D.; "Persistence for C++"; Dr. Dobbs Journal; vol. 21, No. 10, pp. 46–52, Oct. 1996.*

"IBM/JOSS Object Services Persistence Service Specification—Submission to the Object Management Group"; International Business Machines Corporations; SunSoft Inc.; pp. 1–43, Nov. 1993.*

Millard, B., Dasgupta, P., Rao, S., Kuramkote, R., Run–Time Support and Storage Management for Memory–Mapped Persistent Objects, Proceedings the 13th International Conference on Distributed Computing Systems, pp. 508–515, May 1993.*

Harrison, W., Ossher, H., Attaching Instance Variables to Method Realizations Instead of Classes, Proceedings of the 1992 International Conference on Computer Languages, pp. 291–299, Apr. 1992.*

* cited by examiner

Primary Examiner—Tariq R. Hafiz
Assistant Examiner—Todd Ingberg
(74) Attorney, Agent, or Firm—Edward H. Duffield (57) ABSTRACT

A method and system for reusing code extensions prepared by a user or developer are disclosed. The extensions are handled as method implementations and stored in the method body, in a persistent storage model. Thus when the source code is regenerated after a change is made to the metadata in an object, its method body attribute is retrieved intact and the user/developer does not need to re-enter the extensions into the object to be edited.

16 Claims, 5 Drawing Sheets

| test.idl | Model Objects |
|---|---|
| #include "somobj.idl" | OBFileGroup (test.idl) |
| | OBFile (test.idl) |
| |   DMFile(somobj.idl) |
| const short X=1; | DMDataMember(X) |
| enum Fruit {apple, orange}; | OBEnum (Fruit) |
| |   DMDataMember (apple) |
| |   DMDataMember (orange) |
| module M1 | OBModule(M1) |
| { | |
| const short Y=2 |   DMDataMember(Y) |
| interface I1 |   OBInterface(I1) |
|   { | |
|   typedef long x; |     OBTypedef(x) |
|   attribute string name; |     DMDataMember(name) |
|   void print(in short x); |     DMMethod(print) |
|   }; |     DMArg(x) |
| interface I2 | OBinterface(I2) |
|   { | |
|   struct E (char y; long x;); |   OBStruct(E) |
|   attribute E e1; |     DMDataMember(y) |
|   }; |     DMDataMember(x) |
| }; | DMDataMember (e1) |
| interface I1 | OBInterface(I1) |
| { | |
| } | |

REUSING CODE IN OBJECT-ORIENTED PROGRAM DEVELOPMENT

FIELD OF THE INVENTION

The present invention relates in general to the data processing fields and relates in particular to the field of object-oriented programming development systems.

BACKGROUND OF THE INVENTION

Object-oriented development tools commonly include tools which build core portions of programming applications. Typically, a builder tool has a user interface that collects a certain amount of input from the developer for which it creates some skeleton code. This input is metadata. More generally, metadata is self-descriptive information that can describe both services and information. Typically, the generated code does not make up the entire application; thus the user/developer must extend the generated code by using a source editor. An example of such an extension is business logic that computes the salary of an employee. Having prepared the code extensions, the developer will build, that is, compile and link the application using the traditional compiler.

One problem with the traditional method is that when the metadata is changed, the user must re-generate the code. Re-generation will overwrite such code extensions, and thus the extensions need to be re-entered at each code re-generation, either by manual re-input or by cutting and pasting from another file; otherwise the editor will simply enter a null and the previously entered code extensions will be lost.

An additional problem is that traditional builders generate language-specific code. For example, one form of application wizard generates only C++ code, and thus the generated code can be used only by a C++ compiler.

Accordingly, it is an object of the present invention to provide a system that enables the persistent storage and recovery of all such edited code. It is a further object of the present invention to provide a system that enables the storage of such code extensions in a way that is independent of the language in which those code extensions are written. It is a further object of the present invention to provide a mechanism for storing edited code as metadata in support of the development of complex applications using a layered data model for the handling and storage of application development metadata. A general form of such a data model is described in Canadian Patent Application No. 2,201,278, (CA9-97-003), "Hierarchical Metadata Store for an Integrated Development Environment", filed on Mar. 27, 1997.

SUMMARY OF THE INVENTION

Accordingly, the present invention provides, in an object-oriented development system having components that generate skeleton code, a method of storing interface definition and implementation information comprising providing an in-memory storage area and a persistent storage area, retaining the interface definition and implementation information in an in-memory storage area, upon an instruction from a user application following preparation of a modified file containing updates to the information, storing the interface definition and implementation information as meta-data in a persistent storage area, recovering the interface definition and implementation information from the persistent storage area; and writing the interface definition and implementation information to the modified file.

The present invention further provides an object-oriented application development system providing components that generate skeleton code, the system comprising an in-memory data storage area; a persistent data storage area; application program interfaces providing storage capability for interface and implementation information as metadata in either of the storage areas; an editor for modifying code in at least one component; and means for retrieving the information from the persistent storage area.

DETAILED DESCRIPTION OF THE PREFERRED EMBODIMENT

Figure 1:
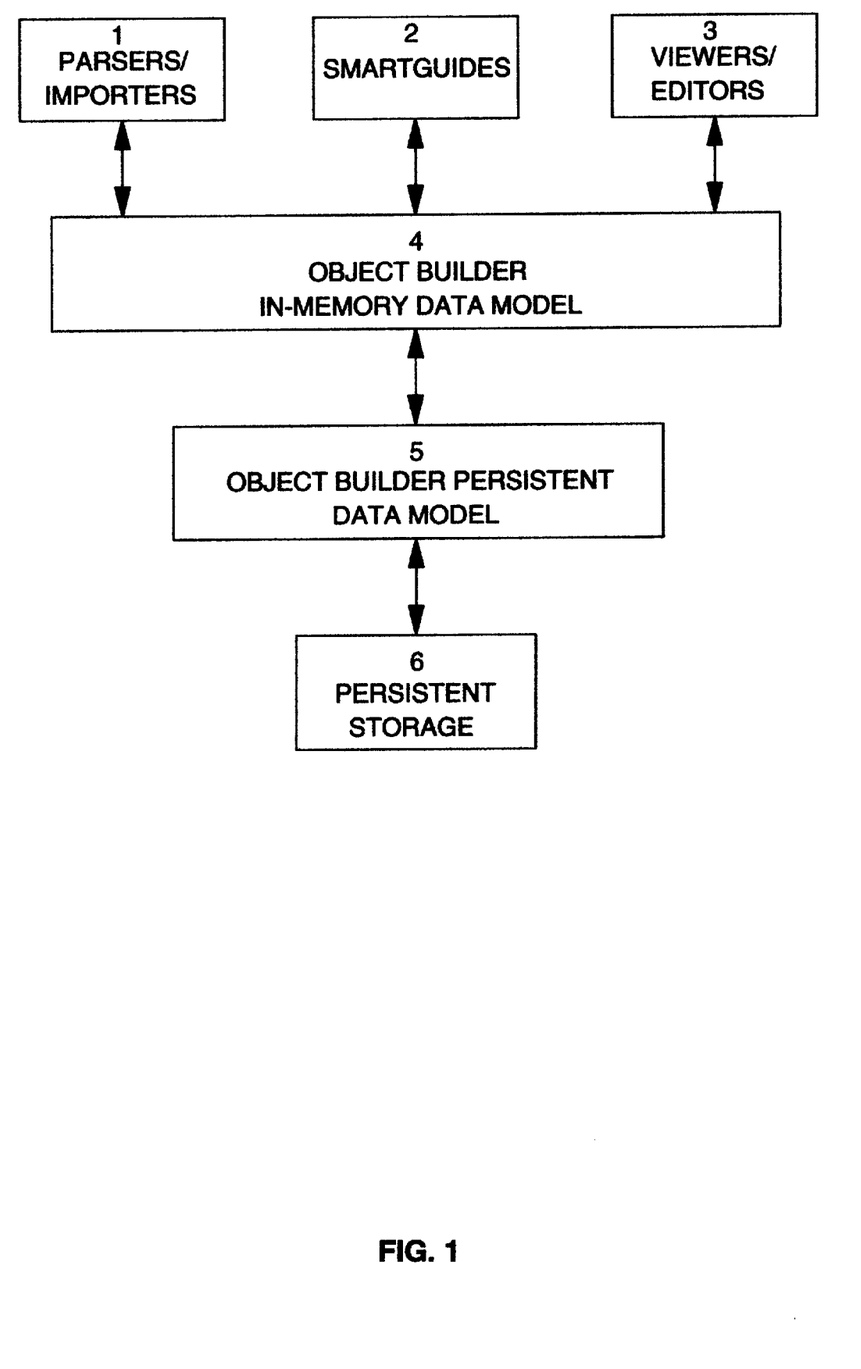
FIG. 1 is a schematic drawing of an object-oriented persistent and in-memory data model upon which the system of the invention is built.

The preferred embodiment of the invention uses the interaction between an object-oriented in-memory data model and an object-oriented persistent data model and provides application programming interfaces (APIs) to store both the interface and implementation information, including business logic, into the data model. An object builder tools helps users build business objects in an application development environment. The APIs can be invoked by user interface components as well as by components that are not part of the user interface, for example a parser or an importer. A user running the object builder tool can view and modify the contents of an interface definition language (IDL) file in the object-oriented persistent data model. From within the object builder tool the user can also edit the method implementation; the method implementation is stored in the persistent data model. If the user regenerates the source code and modifies some information in the interface definition, she can regenerate the interface and the implementation including the previously added code which has been retrieved from the object builder tools persistent data model. Referring now to FIG. 1, the overall architecture of the object-oriented persistent data model and development tools is shown according to a preferred embodiment. Element 1 includes various parsers and importers that handle previously prepared code. For example, a user at viewer editor can invoke the IDL parser 1 to parse an IDL file into in-memory model 4. Various builder tools 2, sometimes called SmartGuides or wizards, are forms of automatic code generating mechanisms that prompt the user or developer for input and then store the metadata in the builder tools in-memory model 4. Additional code can also be entered directly by the user, for example by the edit pane shows in FIG. 2, into original files, or files prepared by parsers and importers 1 or SmartGuides 2. Code prepared by all of these methods is retained in persistent model 4. The in-memory model 4 provides an abstraction for representing interface definition language and Java definitions, supports undo functions and queries, and isolates the parsers and importers 1, wizards 2 and viewers and editors 3 from the implementation details in object-oriented persistent data model 5. The persistent data model provides, among other things, a set of base classes for managing persistence, code generation and development builds. Preferably, each tool provides concrete implementations of the base classes for storing its own data. The persistent data managed by the persistent data model 5 are stored in persistent storage 6, preferably a moving storage unit, for example a hard disk drive.

Figure 2:
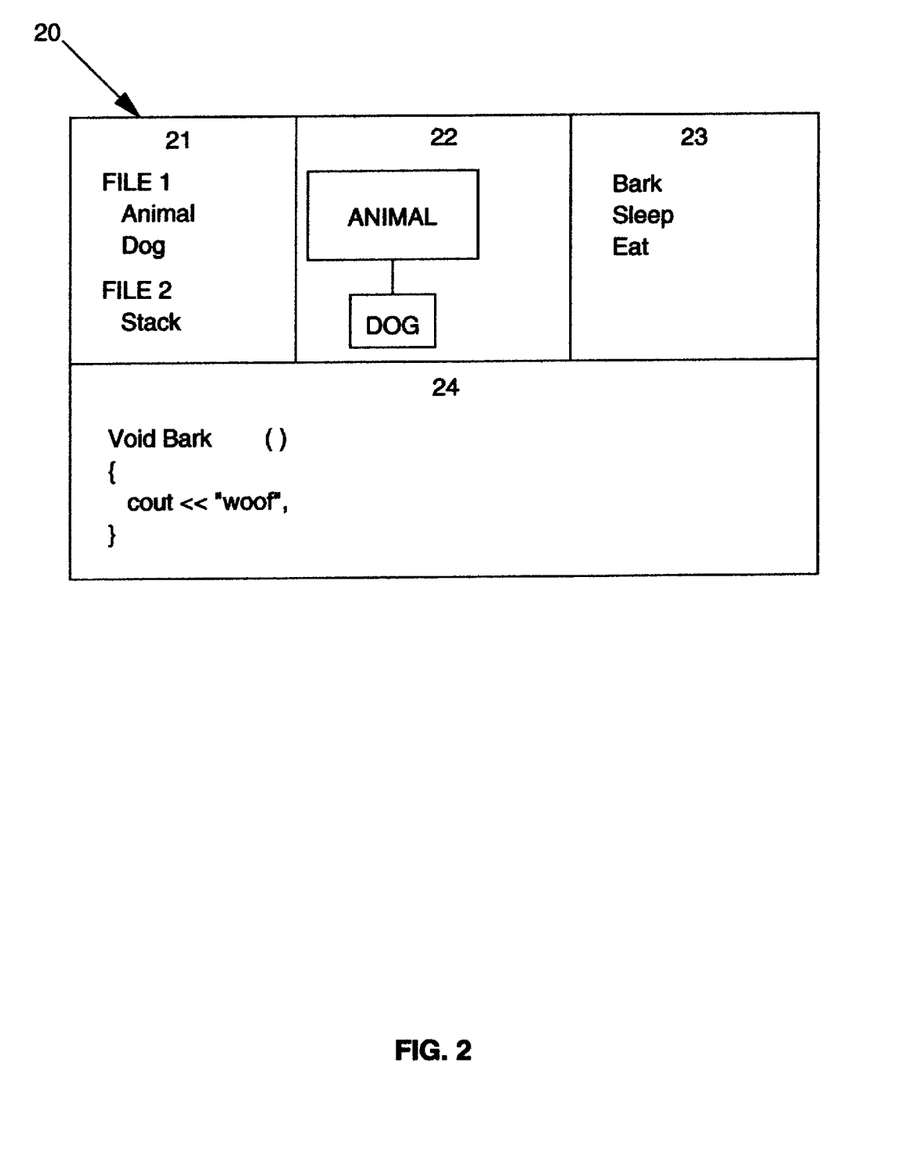
FIG. 2 illustrates a main window displayed by software implementing a preferred embodiment of the invention.

FIG. 2 illustrates a display window as implemented in software using a preferred embodiment of the invention. Main window 20, which is visible to the user who is using the major functions of the development systems, includes file pane 21 that displays a list of files in the tree view as is known to those skilled in the art. Each file is represented by a node in the tree. A file node, for example "Dog", represents a file that is usable by an object-oriented development system, preferably an interface definition language (IDL) file or a Java file. The tree in tree pane 21 can be expanded or contracted in known fashion to represent one or more nodes. For example, an IDL file node can be expanded to nodes that represent modules and interfaces that are contained within the IDL file. As a further example, a Java file node can be expanded to nodes that represent interfaces that are contained within the Java file. Each node is associated with actions that can be invoked in respect of that node. For example, if the node "Animal" is selected, the action "Open" is available by known methods, for example an action bar, that will launch the corresponding builders that are associated with the node; using a builder, the user can enter metadata, for example attribute names, attribute types, method names, parameters or constructed types. File pane 21, like all of the panes in window 20, is scrollable by known methods if the information represented in the pane exceeds the size of the pane on the screen.

Relationship pane 22 displays the inheritance relationships between the node selected in file pane 21 and other files and module with which is associated by inheritance. For example, if a file or a module is selected in file pane 21, all the interfaces within the file or the module and their inheritance relationships will be displayed in relationship pane 22. If an interface node is selected in file pane 21, only the interface node is displayed in relationship pane 22. Method pane 23, displays a list of methods of a class that is selected in relationship pane 22. For example, if the class "Dog" is selected in pane 22, then the methods that have been implemented for the class "Dog" are displayed in method pane 23, namely "bark", "sleeper", and "eat".

In edit pane 24, an editor window is displayed that allows the user to type in or amend the method implementation of a method that is selected in method pane 23. In the example shown here, "bark" is selected in method pane 23, and the code for the method implementation is displayed in edit pane 24. Because the method implementation is stored in the persistent data model 5 of FIG. 1 according to a preferred embodiment of the invention, the action of selecting a method in method pane 23 allows the stored method implementation to be retrieved by a function of the persistent data model and displayed in edit pane 24. Whenever the source code of the application being developed is regenerated, the method implementation in edit pane 24 is saved in the persistent data model 5.

Figure 3:
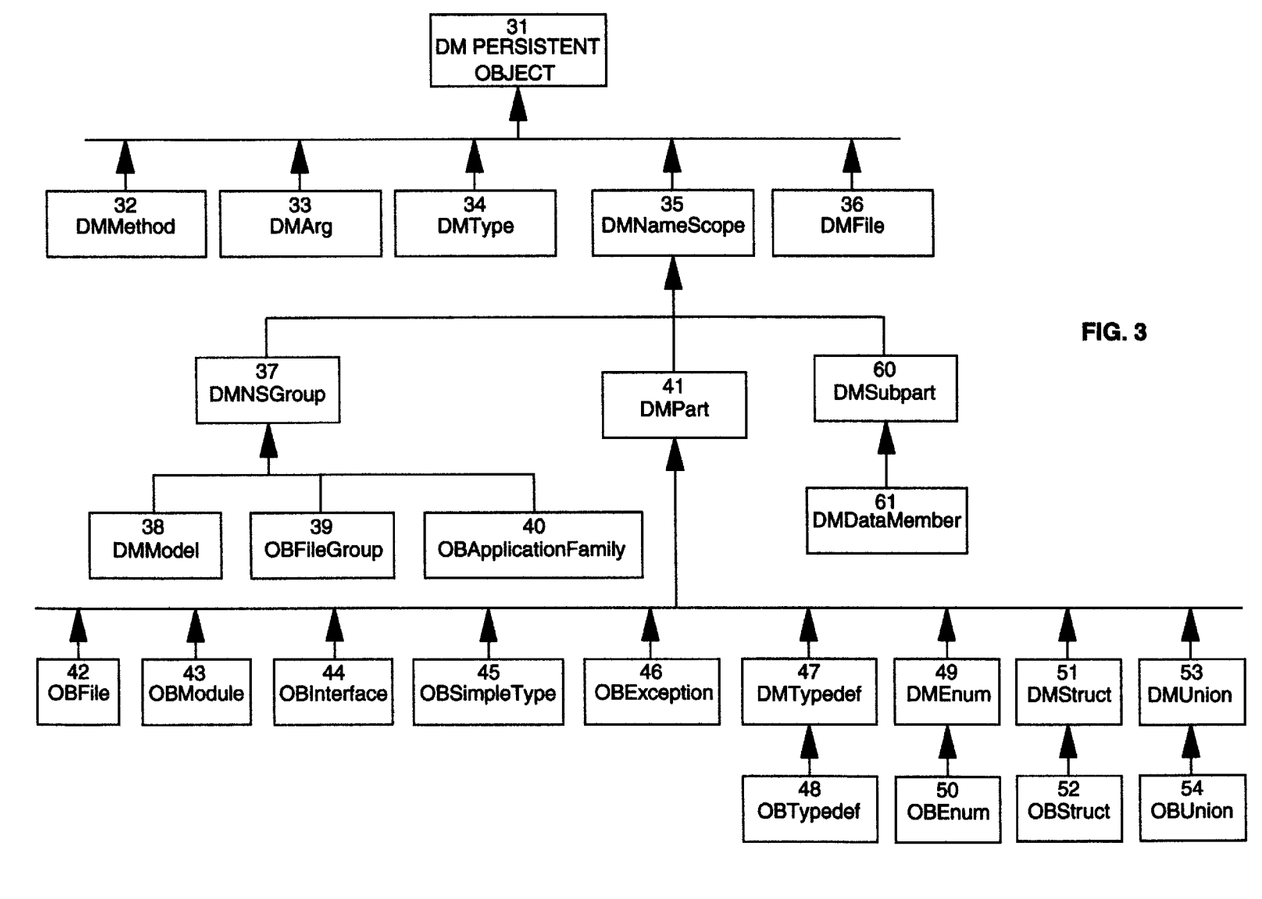
FIG. 3 is an illustration of the derived classes of an object-oriented data model in accordance with a preferred embodiment of the invention.

FIG. 3 illustrates a group of derived classes that are utilized in implementing a preferred embodiment of the invention. All of the classes illustrated in FIG. 3 are derived from the superclass DMPersistent Object 31. The class DMMethod 32 is used to model a method, and includes the attributes shown in the table below. Most of these attributes are used in ways known to the person skilled in the art, except that the attribute MethodBody is the method implementation that the user enters in an edit session shown in panel 24 in FIG. 2, the MethodBody is saved as an integral part of each member of the class DMMethod and thus is recoverable at any time for regeneration of the source code. Preferably, the MethodBody is stored as a string binary large object (string blob). Saving it as a string enables the MethodBody to be recovered as a string and thus is independent of the language in which the string is expressed. The string can contain statements in any appropriate language, for example Smalitalk, C++ or Java. Therefore, no matter the environment in which the user is working, the user can save and retrieve code in the MethodBody that is appropriate to that environment.

| | DMMethod |
|---|---|
| Attribute Name | Description |
| name | The name of the method |
| OB::TypeString | The method return type. (eg. int, or Employee). |
| Oneway | A flag in the IDL case to indicate whether this is a oneway or not. |
| DMMethod::varExceptions | This is a string blob that return the list of exceptions raised by this method. |
| OB::Context | This is a string blob that returns the list of contexts for this method in IDL case. |
| MethodBody | The method implementation that the user enters in the edit session. |
| ImplInterface | For Java, this flag indicates whether this method implements one of the methods in its inherited interfaces. |

The class DMArg 33 is used to model a parameter, and includes the attributes name, OB::Typestring, and directional attribute, which define respectively the name of the parameter; the parameter type, for example int; and the direction of the parameter, namely in, out or inout. The class DMArg 33 operates in ways known to the persons skilled in the art.

The class DMType 34 models a type and includes the attribute part, which relate to the class DM part which will be described below; and qualifiers. Qualifiers are used in a way known to the person skilled in the art, and can include all appropriate declaration qualifiers, for example, * and const. The class DMFile 36 is used to model a list of include files for an IDL file, or a list of import statements for a Java file. The class DMFile 36 has, as its only property, the attribute name, which is the name of an include file or an import statement.

The superclass DMNameScope 35 provides the scope of the class name used in the in memory data model 4 and the persistent model 5 in FIG. 1.

The class DMNSGroup 37 represents a grouping construct and defines a name scope. It is an abstract concept, and its concrete implementation OBFileGroup 39 is used to model a file level construct, for example an IDL file or a Java file. The class OBFileGroup 39 can contain a collection of classes used in the in-memory data model, for example OBFile 42, OBModule 43, OBinterface 44, OBSimpleType 45, OBExcepdion 46, OBTypedef 48, OBEnum 50, OBStruct 52 or OBUnion 54. The class OBFileGroup 39 has a one-to-one relationship to OBFile 42 and a one-to-many relationship with each of OBModule 43, OBinterface 44, OBSimpleType 45, OBException 46, ObTypedef 48, OBEnum 50, OBStruct 52 and OBUnion 54. The relationships are ownership relationships, and when the OBFileGroup object is destructed, all of its contained elements will also be destructed.

The class DMModel 38 represents the model instance root. A user of the model attaches to a specific mode instance using methods in the class DMModel 38.

OBApplication Family 40 is a model for the objects that are saved onto a storage medium for product distribution, for example, a CD-ROM disk. These objects are then installed selectively in a target machine in a software installation step as is known in the art.

DMPart 41 is a part construct and models behaviour for other model objects by way of various relationships. The behaviour model includes, for example, inheritance, data member and method.

In a preferred embodiment of the invention, several classes derive from DMPart 41. The class OBFile 42 is used to model an IDL or Java file; each instantiation of OBFileGroup 39 contains one and only one OBFile 42. The attributes of the OBFile class are shown in the table below.

| Attribute Name | Description |
| --- | --- |
| name | The name of the file |
| FileType | The type of the file. The value can be either Idl or Java. |
| PackageName | The name of the Package for Java |
| Framework | A flag to indicate whether this is a framework |
| OBFile::hasPublic | A flag to indicate whether this Java file contains a public interface. |
| OB::ForwardDecl | A blob containing the list of forward declarations for this scope. |

The class OBModule 43 is used for modelling a module, and includes the attributes name and OB::ForwardDecl, which is a binary large object containing a list of forward declarations.

The class OBinterface 44 is used to model an interface. Its attributes include name, OBlnterface::is Public and OB::ForwardDecl which is described above. The attribute OBlnterface::is Public is a flag which indicates whether the interface is a public interface or not, in the lava implementation of the invention.

Figure 5:
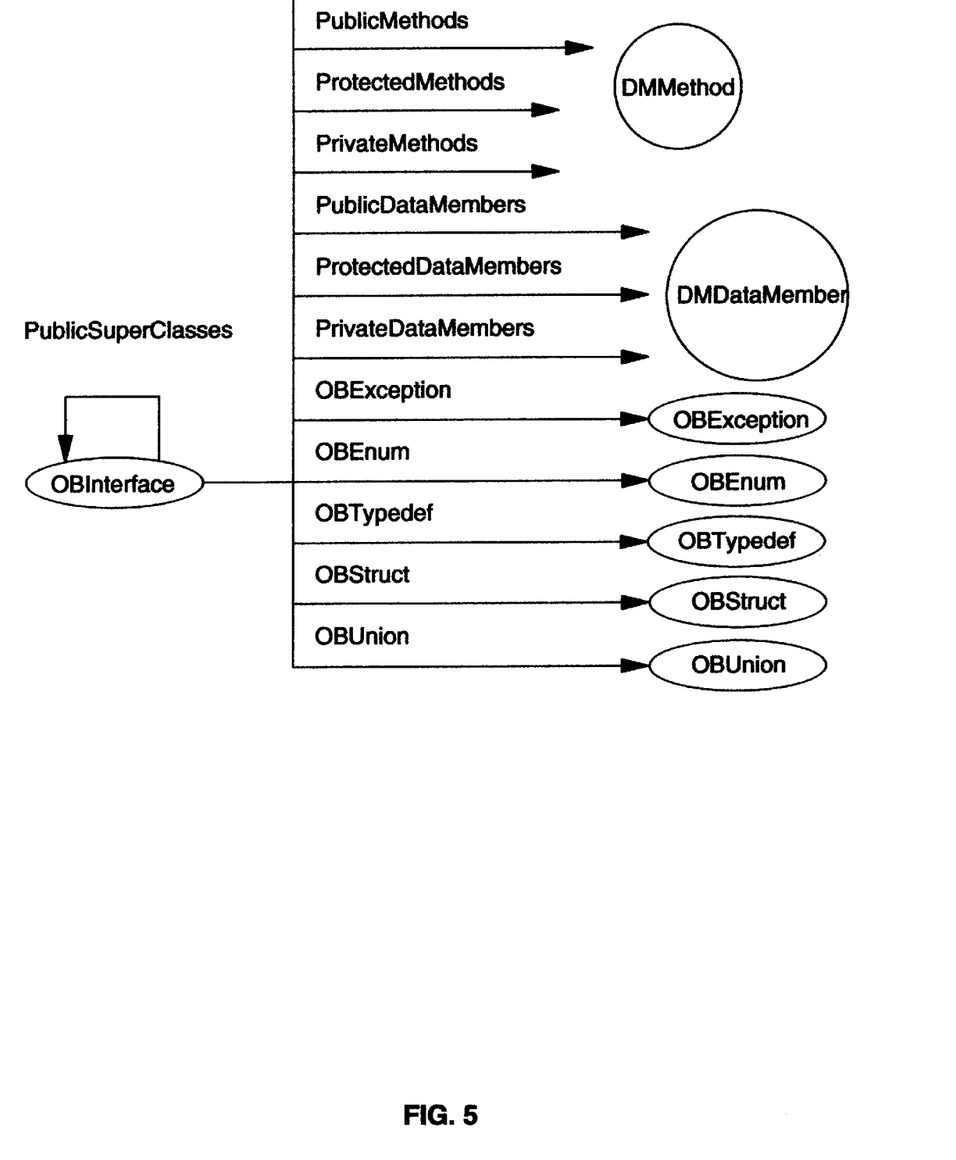
FIG. 5 illustrates the relationships in a preferred embodiment of the invention between an interface class and other elements of the application system.

The class OBlnterface 44 can contain attribute declarations, method declarations and constant declarations for both Java application and interface definition language applications; for interface definition language applications it can also contain type declarations, for example Typedef, Enum, Struct and Union, as well as Exception declarations. An OBlnterface 42 scopes interface level constants, attributes, methods, typedefs, enums, structs, unions, exceptions and an interface parents. FIG. 5 illustrates, in a preferred embodiment, the relationship name for navigation from the OBInterface to the interface level objects, namely DMMethod, DMDataMember, OBException, OBEnum, OBTypedef, OBStruct, and OBUnion.

The class OBSimpleType 45 is used to model any primitive data type that is not otherwise defined by the persistent data model. Examples of such primitive datatypes in interface Definition Language, include "any", or "octet", or, in Java, the primitive datatype "byte". The class OBSimpleType 45 has a property which stores the name of the primitive data type.

The class OBException 46 is used to model an IDL exception definition, in ways common to the object-oriented programming art. It stores the name of the exception.

The class OBTypedef 48 is used to model an IDLTypeDef definition. The class contains the following properties: name, which is the name of the TypeDef; type qualifier which is a flag indicating this TypeDef is a TypeDef of a basic type, for example short, or a bounded sequence, or an unbounded sequence or an array; and size, which indicates the number of elements found if the defined type is a bounded sequence or array. The size attribute is not necessary if the defined TypeDef is a basic type or a bounded sequence.

The classes OBEnum 50, OBStruct 52 and OBUnion 54 are used to model IDL Enums Structs and Unions. The classes OBTypedef 48 OBEnum 50, OBStruct 52 and OBUnion 54 all operate through the corresponding persistent data model classes DMTypedef 47, DMEnum 49, DMStruct 51 and DMUnion 53. The classes whose names begin with "OB" in the preferred embodiment are concrete implementations of the superclasses whose names begin with "DM". The DM superclasses are not instantiated themselves.

The class DMSubpart 60 is a model type. DMDataMember 61 is a concrete implementation of DMSubPart 60. DMDataMember 61 is instantiated by the object builder tool in a preferred embodiment of the invention. DMDataMember 61 is used to model constants, attributes, struct, data members, and enums, that is enumerators. In the preferred embodiment, DMDataMember 61 includes the attributes shown in the table below.

In that table, Getimpi is a string that stores the get implementation for attributes that represent essential state of the object. Setimpi is a string that stores the set implementation for attributes that represent the essential state of the object.

| Attribute Name | Description |
| --- | --- |
| name | The name of the corresponding item. |
| OB::TypeString | The type of the corresponding item. (e.g. int, or Employee). |
| ReadOnly | Applies only to IDL attribute. Set to 1 if it is read only. Set to 0 otherwise. |
| Static | A flag for Java case to indicate that static modifier |
| GetImpl | For attributes in IDL, and public attributes in Java, this property contains the Getter implementation. |
| SetImpl | For attributes in IDL, and public attributes in Java, tis property contains the Setter implementation. |

In the preferred embodiment of the invention described herein, each object that is created by the object builder tool in the persistent data model has a unique name. The unique name is formed by concatenadng its name with its contained path. When an IDL file or a Java file is added, an OBFileGroup object representing the group, and an OBFile object representing the file are created. For example, to add "F1.idl", the system creates an OBFileGroup object of name "::F1". The "::" is appended by the persistent data model framework. Since the OBFileObject is scoped by the OBFileGroup object, its unique name becomes "::F1::F1". If an interface is added, for example "Person" to "F1.idl" and OBinterface object will be created, and its unique name will be "::F1::F1::Person". The unique naming scheme allows the system to employ name scoping across files, modules and interfaces. For example, if "F2.ldl" also contains the "person" interface, its unique name will be "::F2::F2::Person". Thus a desired model object can always be located by searching for its unique name in the part group in which it is located.

The persistent model classes described above with respect to FIG. 3 handle the storage of the objects that make up the programming system being developed; the classes handle the streaming in and the streaming out of the data bits. The invention also uses an in-memory model that sits on top of the persistent classes. The in-memory model provides a simple add, update, delete, and query interface for the viewers, editors, parsers and importers shown in FIG. 1. The in-memory model isolates each component from the underlying persistent data model implementation artifacts.

The in-memory model is the layer that handles the translation from a user-friendly form, for example "F1 " to the persistent model form, for example "::F1::F1". The in-memory model also acts as a cache. That is, the in-memory model stores the data collected by the various user interface dialog. Each in-memory model class has input and output APIs for its required metadata. The metadata remains in the in-memory model object until the user or developer indicates that a change made on the screen is to be adopted, for example by pressing the OK button in a user dialog box; at that point, the appropriate persistent model objects and model object relationships are created. If the user does not wish to make the changes permanent, for example, by clicking on the cancel button in the user interface dialogue, the system does not instantiate the persistent model objects and the model relationships.

In a preferred embodiment, the invention includes the following classes in its in-memory model.

The class IXORepository provides an encapsulation for the model as a whole. It creates and stores the DMModel object and provides query functions by means known in the art to locate all the files that are contained in the model or to find a specific file by name in the model.

The class IXOFileGroup creates and stores the OBFileGroup object. It provides an emit method that can be called to generate a code for the interface and implementation that are associated with a specific file group.

The class IXOFile creates and stores the OBFile object that represents an IDL or Lava file. It also creates an DMFile object for each include or import statement. It provides methods to add and to query module, interface, constant, typedef, struct, enum, union, and exception that are scoped at the specific file level.

The class IXOModule creates and it stores the OBModule object that represents an IDL module. It provides methods to add and query module, interface, constant, typedef, struct, enum, union, and exception that are scoped at the specific module level. The class IXOLInterface creates and stores the OBInterface object that represents an IDL interface or a lava interface. This class provides methods to add, query and find attribute, method, constant, typedef, struct, enum, union, and exception that are scoped at the specific interface level. The class IXOInterface also provides methods to add and to query the parent interfaces of the specific interface. When a parent interface is added, any method that needs to overwritten or implemented from the parent class will result in a DMMethod object being created and added to this class.

The class IXOType encapsulates a type definition and an IXOType object is created for each of the following cases or events: the type of an attribute, the return type of a method, the type of a parameter, the type of a struct data member, the type of an exception data member, the type of a union data member and the type of a TypeDef. In order to add any of these objects to the persistent data model, the DMPart object representing its type must already have been added to the persistent model. The IXOType class provides operations to locate the DMPart that represents the type, or to add an empty OBinterface object that represents the type.

The class IXOMember creates and stores the DMDataMember and associates it with a DMPart.

The class IXOConstant is derived from IXOMember. It is used to represent an IDL constant. Each IDL constant has a name, a type, and a value. This class called a method IXOMember::to cdm to create the persistent data model DMDataMember object, and then adds the required constant declaration qualifier, and the constant value.

The class IXOAttribute is derived from IXOConstant and is used to represent an IDL attribute or a Java member. Optionally, if the class represents a Java data member, initialization values can also be included in the attributes of this class.

The class IXOOperation creates and stores the DMMethod object that represents an IDL method or Java method and it provides methods to add and query the list of parameters associated with the method. It also provides methods to get and set the method implementation for the corresponding method.

The class IXOParameter creates and stores the object DMArg 33 in FIG. 3, that represents an IDL or Java parameter.

The class IXOException creates and stores the object OBException 46 that represents an IDL exception. The class IXOException also provides methods to add and query the list of exception members that are scoped by the specific exception. It also delegates to the IXOMember class the task of creating its exception members.

The class IXOEnum creates and stores the object OBEnum 50 that represents an IDL Enum. It provides methods to add and query the list of enumerators and members that are scoped by this enum type. It delegates to the IXOMember class the task of creating its enumerators.

The class IXOStruct creates and stores the OBStruct 52 object that represents an IDL struct. It provides methods to add and query the list of struct members that are scoped by the specific structure. It delegates to the IXOMember the task of creating its struct members.

The class IXOUnion creates and stores the OBUnion 54 object that represents an IDL union. It also provides methods to add and query the list of union members that are scoped by this union. It delegates to the IXOUnion member class the task of creating its union members.

The class IXOUnion member is derived from IXOMember, and is used to represent an IDL union member. Each IDL union member has a case label, a name and a type. This class calls the method IXOMember::to CDM, which creates the DMDataMember object for the union member and then adds the case label value to the DMDataMember object thus created. Finally, the class IXOTypeDef creates and stores the object OBTypedef 48 that represents an IDL typedef.

Figure 4:
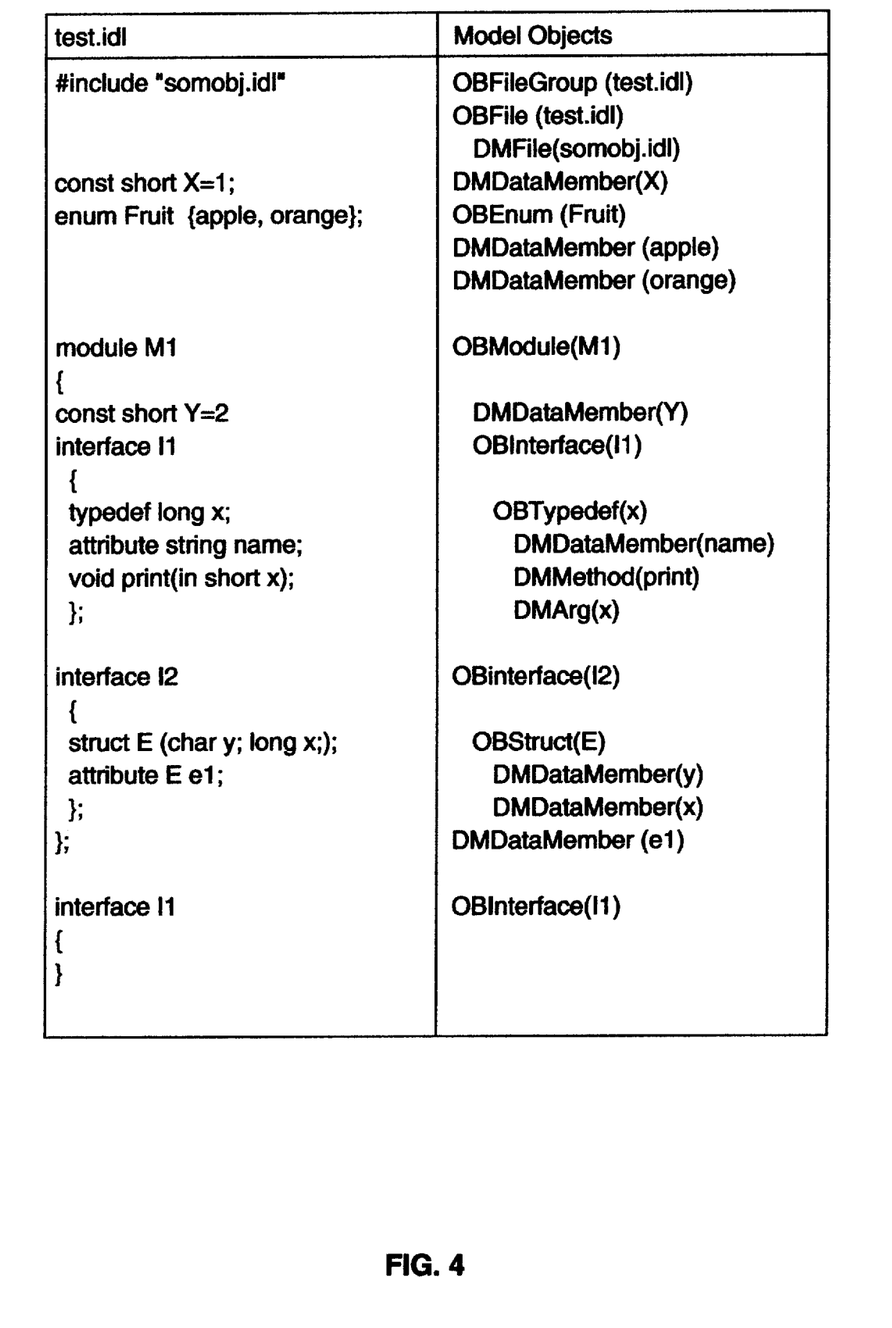
FIG. 4 is an example of a file according to preferred embodiment of the invention that illustrates what model objects are instantiated for the interface definition language (IDL) constructs in an example file.

FIG. 4 is an example of an IDL file test.IDL and the model objects that are instantiated by a preferred embodiment of the invention for each of the elements in the file test.IDL. On the left side of the figure are shown code fragments that implement some of the elements described above and opposite them on the right side of FIG. 4 are shown the objects that are created in the preferred embodiment of the invention. The objects are shown as types, and, (the instances of those types that are created by the system). The statement # include "SomObj.idl" tells the system to add the header file SomObj.idl and creates an instance test.idl of the object OBFileGroup. It also creates an instance test.idl of the object OBFile, and an instance SomObj.idl of the object DMFile. Similarly, instances of other classes are created by the system for each of the statements within the file test.idl.

Example

Shown below is an example of a code fragment created by a typical application according to the prior art, and similar code fragment created according to the preferred embodiment of the invention.

For example, a developer creates an IDL file, a.idl, containing the following code:

```
interface A
{
    void print ()
}
```

Upon generation of an object in source code relating to the above code fragment, a prior art system would create an implementation file, a.cpp containing the following code:

```
void A::print ()
{
    cout << "hello";
}
```

At a later date, the developer adds a parameter to the IDL file, and produces the following code in the file a.idl:

```
interface A
{
    void print (in short p1);
}
```

The prior art system would take this change and regenerate the a.cpp file without the text that was intended to be displayed on the screen, and would contain the code shown below:

```
void A::print(in short p1)
{
    (nulls)
}
```

Thus, when the user has changed the parameter list for the print statement, the prior art process has overwritten the text that the user had previously entered with nulls, and the user is required to re-enter the text in the a.cpp file.

Using the preferred embodiment of the invention, the user prepares an IDL file containing the same code, as below:

```
interface A
{
    void print ()
}
```

The system creates a class called OBInterface in the in-memory model, and, in the persistent model, instances of the class DMMethod and the class DMArg. As described above, the instance of DMMethod includes the attribute MethodBody which contains the method implementation that the user entered in the edit session, namely 'cout<<"hello";'.

The method implementation in the MethodBody includes:

```
void A::print ()
{
    cout < < "hello";
}
```

When the user decides to make the change permanent, for example by clicking on the Ol( button in a user dialogue box, the DMMethod including the MethodBody is saved in the persistent data model.

When the user makes the change to add a parameter at a later date, for example, to change the print statement from having no parameters to having the parameter in short p1, the MethodBody is not changed by the system.

The generated a.IDL file would include the code below:

```
interface A
{
    void print (in short p1);
}
```

Thus the text that the user previously entered is recovered in the form below for viewing and for further editing at the option of the user.

```
void A::print(in short p1)
{
    cout < < "hello";
}
```

As described above, the MethodBody is saved as a string binary large object, and therefore is not changed by the system except upon being edited by the user. Because the MethodBody is a string, it can contain material that can be used in any platform upon which the user is working. For example, it can contain Java code or C++ code or a combination of text and code an individual language.

An advantage of the invention is that the user does not have to re-enter large amounts of text and code from IDL files that previously would overwrite text that was entered by way of an editor. A further advantage is that the invention is inherently independent of the language used because the code and text entered by means of an editor is stored as string data in the MethodBody attribute of the instances of a DMMethod class, and is retrieved in the same way.

The embodiments of the invention in which an exclusive property or privilege is claimed are defined as follows:

1. In an object-oriented development system having components that generate skeleton source code, a method of storing interface definition information and implementation information comprising:
   a) providing an in-memory storage model and a persistent storage model;
   b) retaining said interface definition information and implementation information in a method body in said in-memory storage model;

c) upon an instruction from a user application following preparation of a modified file containing updates to said implementation information, storing said interface definition and updated implementation information as meta-data in said persistent storage model;

d) recovering said interface definition and updated implementation information from said persistent storage model; and e) regenerating skeleton code containing said modified implementation information.

2. A method as claimed in claim 1, wherein said implementation informaton is stored as an attribute of an instance of a class.

3. A method as claimed in claim 1, wherein said implementation information is stored as a binary large object block.

4. A method as claimed in claim 3, wherein said implementation information comprises a text string.

5. An object-oriented application development system providing components that generate skeleton source code, said system comprising:

a) an in-memory data storage area;

b) a persistent data storage area;

c) application program interfaces providing storage capability for interface definition information and implementation information as metadata in a method body in either of said storage areas;

d) an editor for modifying code in at least one component of the implementation information;

e) means for retrieving said information from the persistent data storage area; and f) means for regenerating said skeleton source code.

6. A system as claimed in claim 5, wherein said persistent data storage area is provided in a persistent data model.

7. A system as claimed in claim 5 wherein said implementation information is stored as an attribute of an instance of a class.

8. A system as claimed in claim 5 to 7 wherein said implementation information is stored in the form of a binary large object block.

9. A system as claimed in claim 8 wherein said implementation information comprises a block of code in a high level computer language.

10. A system as claimed in claim 7 wherein said metadata is stored as method implementation information.

11. A system as claimed in any of claim 7 to 10 wherein said implementation information comprises business logic.

12. A system as claimed in any of claim 7 to 11 wherein said implementation information comprises a text string.

13. In an object-oriented programming system having a persistent data model, a graphical editor for application programs, comprising machine executable instructions for:

displaying a graphical file tree structure in an applications program under development;

monitoring user input requesting the display of an object from said file tree structure, and, responsive to said request, highlighting said object in said file tree display;

displaying the inheritance relationships of the requested object in said file tree and displaying a list of methods in a class corresponding to a user's selection of one of said displayed inheritance relationships;

displaying for editing a stored method implementation representing a method selected from said displayed list of methods;

saving the edited method implementation as metadata within said object in said persistent data model; and regenerating the source code of said application program under development.

14. A computer-readable memory for storing the statements or instructions for use in the execution in a computer of any one of the systems of claims 2-9 or 13.

15. In an object-oriented programming system having a persistent data model, a method of graphically editing application programs, said method comprising:

displaying a graphical file tree structure in an applications program under development;

monitoring user input requesting the display of an object from said file tree structure, and, responsive to said request, highlighting said object in said file tree display;

displaying the inheritance relationships of the requested object in said file tree and displaying a list of methods in a class corresponding to a user's selection of one of said displayed inheritance relationships;

displaying for editing a stored method implementation representing a method selected from said displayed list of methods;

saving the edited method implementation as metadata within said object in said persistent data model; and regenerating the source code of said application program under development.

16. A computer-readable medium having executable statements or instructions for performing the methods of any one of claims 1, 2, 3, 8 and 15.

* * * * *